(12) United States Patent
Kang et al.

(10) Patent No.: US 11,194,512 B2
(45) Date of Patent: Dec. 7, 2021

(54) DATA STORAGE DEVICE WHICH SELECTIVELY PERFORMS A CACHE READ OR A NORMAL READ OPERATION DEPENDING ON WORK LOAD AND OPERATING METHOD THEREOF

(71) Applicant: SK hynix Inc., Gyeonggi-do (KR)

(72) Inventors: Min Gu Kang, Seoul (KR); Jin Soo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 141 days.

(21) Appl. No.: 16/511,653

(22) Filed: Jul. 15, 2019

(65) Prior Publication Data

US 2020/0042249 A1 Feb. 6, 2020

(30) Foreign Application Priority Data

Aug. 3, 2018 (KR) .......................... 10-2018-0090862

(51) Int. Cl.
*G06F 3/06* (2006.01)
*G06F 12/0802* (2016.01)
*G06F 12/02* (2006.01)

(52) U.S. Cl.
CPC .......... *G06F 3/0659* (2013.01); *G06F 3/0658* (2013.01); *G06F 3/0679* (2013.01); *G06F 12/0246* (2013.01); *G06F 12/0802* (2013.01); *G06F 3/0607* (2013.01)

(58) Field of Classification Search
CPC ...... G06F 3/0607; G06F 3/061; G06F 3/0656; G06F 3/0658; G06F 3/0659; G06F 3/0679; G06F 12/0246; G06F 12/0802; G06F 12/0868; G06F 12/0877; G06F 12/0888; G06F 12/0897; G06F 2003/0691; G06F 2212/1016; G06F 2212/214; G06F 2212/313; G06F 2212/502; G06F 2212/7203; Y02D 10/00
See application file for complete search history.

(56) References Cited

U.S. PATENT DOCUMENTS

| | | | | |
|---|---|---|---|---|
| 6,253,289 | B1 * | 6/2001 | Bates, Jr. | ............ G06F 12/0862 711/118 |
| 8,244,963 | B2 | 8/2012 | Yeh | |
| 2008/0112238 | A1 * | 5/2008 | Kim | ....................... G11C 29/82 365/200 |
| 2011/0055456 | A1 * | 3/2011 | Yeh | ..................... G06F 12/0862 711/103 |
| 2019/0073139 | A1 * | 3/2019 | Kim | ....................... G06F 3/0658 |
| 2019/0317901 | A1 * | 10/2019 | Kachare | .............. G06F 12/0246 |

* cited by examiner

*Primary Examiner* — Larry T Mackall
(74) *Attorney, Agent, or Firm* — IP & T Group LLP

(57) ABSTRACT

A data storage device may include: a nonvolatile memory device; and a controller configured to control a read operation of the nonvolatile memory device, wherein the controller includes: a memory configured to store workload pattern information; and a processor configured to check a workload pattern in a first period based on the workload pattern information, and decide on a read mode to be performed in a second period following the first period, according to the workload pattern of the first period.

14 Claims, 9 Drawing Sheets

FIG.3
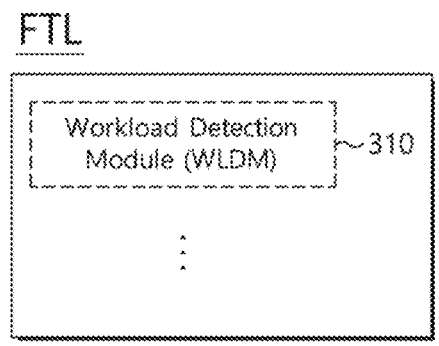
FIG.4
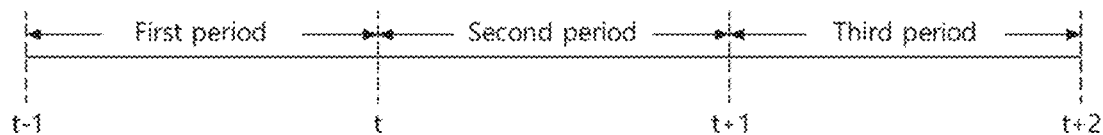
FIG.5
WLPI(workload pattern information)
| Only Read CMD | One type of chunk size | Queue depth above threshold |
|---|---|---|
| Set(1) / Reset(0) | Set(1) / Reset(0) | Set(1) / Reset(0) |

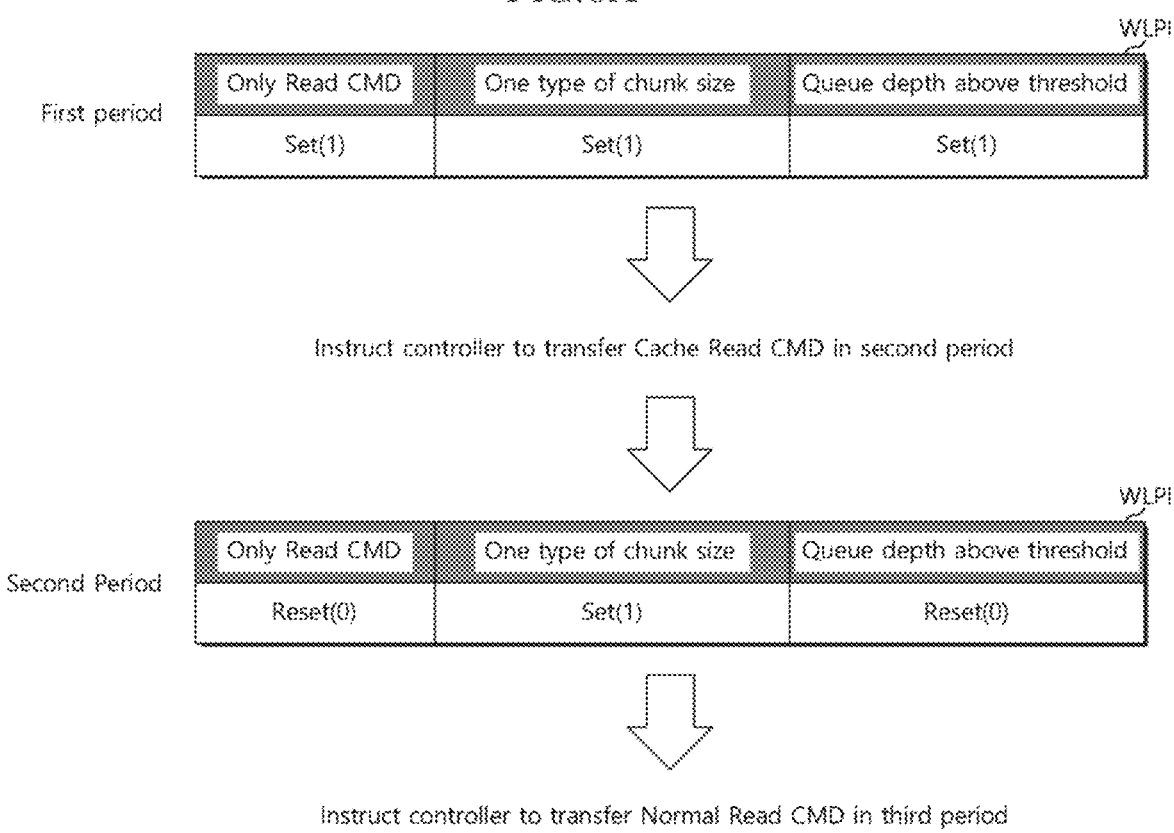

< Normal Read Operation >

< Cache Read Operation >

DATA STORAGE DEVICE WHICH SELECTIVELY PERFORMS A CACHE READ OR A NORMAL READ OPERATION DEPENDING ON WORK LOAD AND OPERATING METHOD THEREOF

CROSS-REFERENCE TO RELATED APPLICATION

The present application claims priority under 35 U.S.C. § 119(a) to Korean application number 10-2018-0090862, filed on Aug. 3, 2018, in the Korean Intellectual Property Office, which is incorporated herein by reference in its entirety.

BACKGROUND

1. Technical Field

Various embodiments of the present disclosure generally relate to a semiconductor device, and more particularly, to a data storage device and an operating method thereof.

2. Related Art

Recently, the paradigm for the computing environment has shifted to ubiquitous computing in which computer systems can be used anytime and anywhere. Therefore, the use of portable electronic devices such as mobile phones, digital cameras and notebook computers has rapidly increased. Such portable electronic devices generally use a data storage device using a memory device. The data storage device is used to store data which are used in the portable electronic devices.

Since a data storage device using a memory device has no mechanical driver, the data storage device has excellent stability and durability, high information access speed, and low power consumption. A data storage device having such advantages includes a universal serial bus (USB) memory device, a memory card having various interfaces, a universal flash storage (UFS) device, and a solid state drive (SSD).

SUMMARY

Various embodiments are directed to a data storage device capable of selectively performing a cache read operation and a normal read operation depending on work load, and an operating method thereof.

In an embodiment, a data storage device may include: a nonvolatile memory device; and a controller configured to control a read operation of the nonvolatile memory device, wherein the controller includes: a memory configured to store workload pattern information; and a processor configured to check a workload pattern in a first period based on the workload pattern information, and decide on a read mode to be performed in a second period following the first period, according to the workload pattern of the first period.

In an embodiment, an operating method of a data storage device may include: checking a workload pattern in a first period based on the workload pattern information; and deciding on a read mode to be performed in a second period following the first period, according to the workload pattern of the first period.

In an embodiment, a data storage device may include: a nonvolatile memory device; and a controller configured to control, during a current period, the nonvolatile memory device to perform a cache read operation when the nonvolatile memory device performs a set number of times only a read operation for data chunks of a single size during a previous period.

BRIEF DESCRIPTION OF THE DRAWINGS

FIG. 3 illustrates a flash translation layer (FTL).

FIG. 4 illustrates periods which are set to detect workload patterns.

FIG. 5 illustrates workload pattern information.

FIG. 6A illustrates a process of deciding which read operation to perform in a subsequent period, according to a workload pattern.

DETAILED DESCRIPTION

A data storage device and an operating method thereof according to the present disclosure are described below with reference to the accompanying drawings through various embodiments. Throughout the specification, reference to "an embodiment" or the like is not necessarily to only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Figure 1:
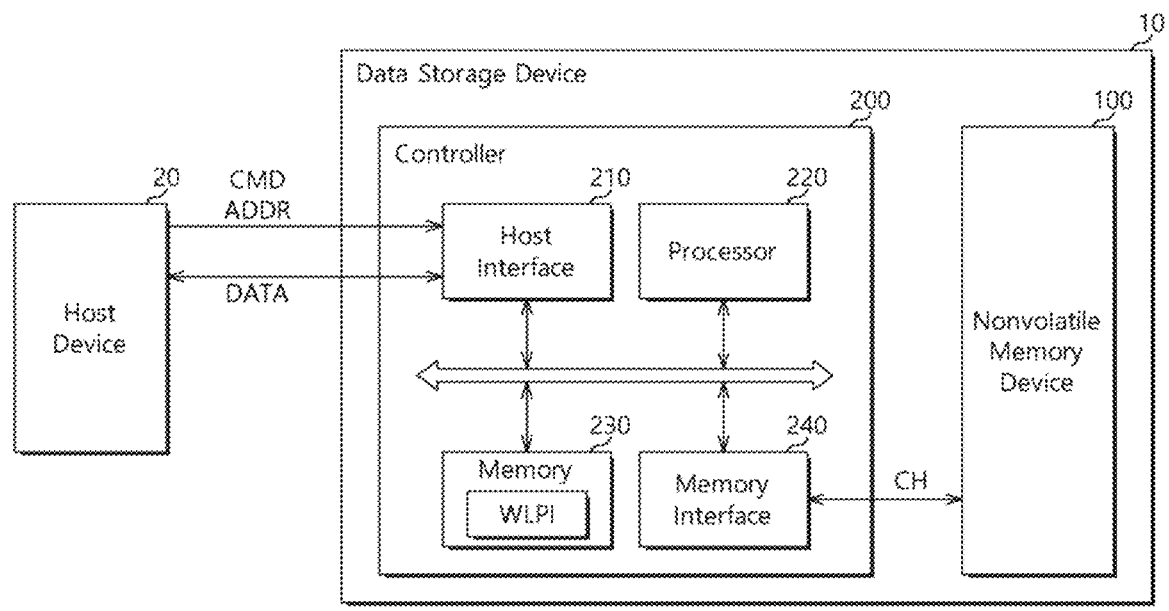
FIG. 1 illustrates a configuration of a data storage device in accordance with an embodiment.

FIG. 1 illustrates a configuration of a data storage device 10 in accordance with an embodiment.

Referring to FIG. 1, the data storage device 10 may store data accessed by a host device 20 such as a mobile phone, MP3 player, laptop computer, desktop computer, game machine, TV or in-vehicle infotainment system. The data storage device 10 may be referred to as a memory system.

The data storage device 10 may be configured as any of various storage devices, depending on an interface protocol coupled to the host device 20. For example, the data storage device 10 may be configured as any of a solid state drive (SSD), a multi-media card (MMC) such as an eMMC, RS-MMC or micro-MMC, a secure digital (SD) card such as a mini-SD or micro-SD, a universal serial bus (USB) storage device, a universal flash storage (UFS) device, a personal computer memory card international association (PCMCIA) card-type storage device, a peripheral component interconnection (PCI) card-type storage device, a PCI express (PCI-E) card-type storage device, a compact flash (CF) card, a smart media card and a memory stick.

The data storage device 10 may be fabricated as any of various types of packages, such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as a storage medium of the data storage device 10. The nonvolatile memory device 100 may be configured as any of various types of nonvolatile memory devices, such as a NAND flash memory device, a NOR flash memory device, a ferroelectric random access memory (FRAM) using ferroelectric capacitors, a magnetic random access memory (MRAM) using a tunneling magneto-resistive (TMR) layer, a phase change random access memory (PRAM) using chalcogenide alloys, and a resistive random access memory (ReRAM) using transition metal oxide, depending on memory cells.

FIG. 1 illustrates that the data storage device 10 includes one nonvolatile memory device 100, but this is only an example. The data storage device 10 may include a plurality of nonvolatile memory devices, and the present invention may also be applied in the same manner to the data storage device 10 including the plurality of nonvolatile memory devices.

The nonvolatile memory device 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each of the memory cells of the memory cell array may be configured as a single level cell (SLC) for storing 1-bit data or a multi-level cell (MLC) for storing 2 or more-bit data. The MLC may store 2-bit data, 3-bit data, 4-bit data or higher number of bits. In general, a memory cell for storing 2-bit data may be referred to as an MLC, a memory cell for storing 3-bit data may be referred to as a triple level cell (TLC), and a memory cell for storing 4-bit data may be referred to as a quadruple level cell (QLC). In the present specification, however, the memory cells for storing 2-bit to 4-bit data may be collectively referred to as MLCs, for convenience of description.

The memory cell array 110 may include one or more of the SLC and the MLC. Furthermore, the memory cell array 110 may include memory cells with a two-dimensional horizontal structure or memory cells with a three-dimensional vertical structure.

The controller 200 may control overall operations of the data storage device 10 by driving firmware or software loaded to a memory 230. The controller 200 may decode and drive a code-based instruction or algorithm such as firmware or software. The controller 200 may be implemented in hardware or a combination of hardware and software.

The controller 200 may include a host interface 210, a processor 220, the memory 230 and a memory interface 240. Although not illustrated in FIG. 1, the controller 200 may further include an error correction code (ECC) engine which generates parity data by performing ECC encoding on write data provided from a host device, and performs ECC decoding on read data read from the nonvolatile memory device 100 using the parity data.

The host interface 210 may interface the host device 20 and the data storage device 10 in response to a protocol of the host device 20. For example, the host interface 210 may communicate with the host device 20 through any one of the following protocols: USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and PCI-e (PCI express).

The processor 220 may include a micro control unit (MCU) and/or a central processing unit (CPU). The processor 220 may process a request transferred from the host device 20. In order to process the request transferred from the host device 20, the processor 220 may drive a code-based instruction or algorithm, i.e., firmware, which is loaded to the memory 230, and control the nonvolatile memory device 100 and internal function blocks such as the host interface 210, the memory 230 and the memory interface 240.

The processor 220 may generate control signals for controlling an operation of the nonvolatile memory device 100, based on requests transferred from the host device 20, and provide the generated control signals to the nonvolatile memory device 100 through the memory interface 240.

The memory 230 may be configured as a random access memory such as a dynamic RAM (DRAM) or static RAM (SRAM). The memory 230 may store the firmware driven by the processor 220. Furthermore, the memory 230 may store data required for driving the firmware, for example, metadata. That is, the memory 230 may operate as a working memory of the processor 220.

The memory 230 may include a data buffer for temporarily storing write data to be transferred to the nonvolatile memory device 100 from the host device 20 or read data to be transferred to the host device 20 from the nonvolatile memory device 100. That is, the memory 230 may operate as a buffer memory.

The memory interface 240 may control the nonvolatile memory device 100 under control of the processor 220. The memory interface 240 may also be referred to as a memory controller. The memory interface 240 may provide control signals to the nonvolatile memory device 100. The control signals may include a command, address and operation control signal for controlling the nonvolatile memory device 100. The memory interface 240 may provide data stored in the data buffer to the nonvolatile memory device 100, or store data transferred from the nonvolatile memory device 100 in the data buffer.

Figure 2:
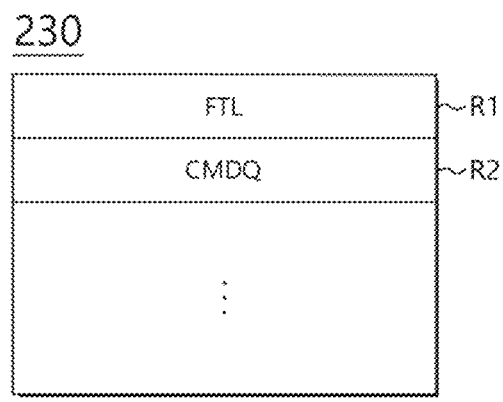
FIG. 2 illustrates a configuration of a memory, such as that of FIG. 1.

FIG. 2 illustrates the memory 230 of FIG. 1 in accordance with an embodiment.

Referring to FIG. 2, the memory 230 may include a first region R1 in which a flash translation layer (FTL) is stored and a second region R2 which is used as a command queue CMDQ for queuing one or more commands corresponding to request(s) provided from the host device 20. However, the memory 230 may include regions for various other uses, such as a region used as a write data buffer for temporarily storing write data, a region used as a read data buffer for temporarily storing read data, and a region used as a map cache buffer for caching map data, in addition to the regions illustrated in FIG. 2.

The memory 230 may include a region (not illustrated) in which system data or metadata are stored. Workload pattern information WLPI may be stored in the region of the memory 230, in which the system data or metadata are stored. The workload pattern information WLPI will be described below in detail with reference to FIG. 5.

When the nonvolatile memory device 100 is configured as a flash memory device, the processor 220 may control a unique operation of the nonvolatile memory device 100, and drive the FTL in order to provide device compatibility to the host device 20. As the FTL is driven, the data storage device 10 may be recognized and used as a general data storage device such as a hard disk by the host device 20.

The FTL stored in the first region R1 of the memory 230 may include modules for performing various functions and metadata required for driving the respective modules. The FTL may be stored in a system region (not illustrated) of the nonvolatile memory device 100. When the data storage device 10 is powered on, the FTL may be read from the system region of the nonvolatile memory device 100 and loaded to the first region R1 of the memory 230.

FIG. 3 illustrates the FTL in accordance with an embodiment.

Referring to FIG. 3, the FTL may include a workload detection module (WLDM) 310 and the like, but is not specifically limited thereto. While FIG. 3 illustrates only the workload pattern information WLDM, it will be apparent to those skilled in the art that the FTL may further include various function modules such as a garbage collection module, a wear-leveling module, a bad block management module, an address map module, a write module, a read module and a map module.

The WLDM 310 may detect a workload pattern in a set period. The WLDM 310 may update the workload pattern information WLPI stored in the memory 230 based on the detected workload pattern. The WLDM 310 may decide whether to perform a cache read operation or a normal read operation in a subsequent period, by referring to the workload pattern information WLPI, and provide the processor 220 with a read control signal corresponding to the decision result. In the present embodiment, the WLDM 310 may be driven by control of the processor 220. In the present embodiment, the configuration in which the WLDM 310 is included in the FTL will be taken as an example for description. However, the WLDM 310 may be configured in hardware or a combination of hardware and software.

FIG. 4 illustrates periods which are set to detect a workload pattern, and FIG. 5 illustrates the workload pattern information WLPI.

By way of example, FIG. 4 illustrates only first to third periods. However, the number of periods is not specifically limited to three, but may be increased as a time elapses. In FIG. 4, 't' may indicate a current time point, and 't−1' may indicate a time point before the current time point. Furthermore, 't+1' may indicate a time point after the current time point, and 't+2' may indicate a time point after 't+1'. The time between adjacent time points may be constant. For example, adjacent time points may be separated by a set time. However, the present invention is not limited to this configuration. In another embodiment, the time intervals between adjacent time points may be different.

At the time point 't', the processor 220 may drive the WLDM 310 to detect a workload pattern in a first period from the time point 't−1' to the time point 't'. For example, the workload pattern may include various pieces of information such as the types of commands provided to the nonvolatile memory device 100 in the corresponding period, the sizes of data chunks provided to the nonvolatile memory device 100, and a queue depth. However, the workload pattern is not specifically limited to the above-identified information.

For example, the WLDM 310 may detect whether the commands provided to the nonvolatile memory device 100 in the corresponding, e.g., first, period are all read commands or all write commands or a mixture of read commands and write commands. The WLDM 310 may detect whether the sizes of data chunks provided to the nonvolatile memory device 100 in the corresponding, e.g., first, period are one size or a plurality of sizes. Furthermore, the WLDM 310 may detect whether or not the number of commands queued in the command queue CMDQ in the corresponding, e.g., first, period, that is, the queue depth, is greater than or equal to a threshold value.

When the commands provided to the nonvolatile memory device 100 in the first period are all read commands, the WLDM 310 may set a first field (Only Read CMD) of the workload pattern information WLPI illustrated in FIG. 5 to a 'set (1)' state. When the sizes of the data chunks provided to the nonvolatile memory device 100 in the first period are all the same, the WLDM 310 may set a second field (One type of chunk size) of the workload pattern information WLPI to the 'set (1)' state. Furthermore, when the number of commands queued in the command queue CMDQ in the first period, i.e. the queue depth, is greater than or equal to the threshold value, the WLDM 310 may set a third field (Queue depth above threshold) of the workload pattern information WLPI to the 'set (1)' state.

The workload pattern information WLPI may serve as reference information for determining whether performing the cache read operation would be more efficient or performing the normal read operation would be more efficient in a subsequent period.

Figure 6B:
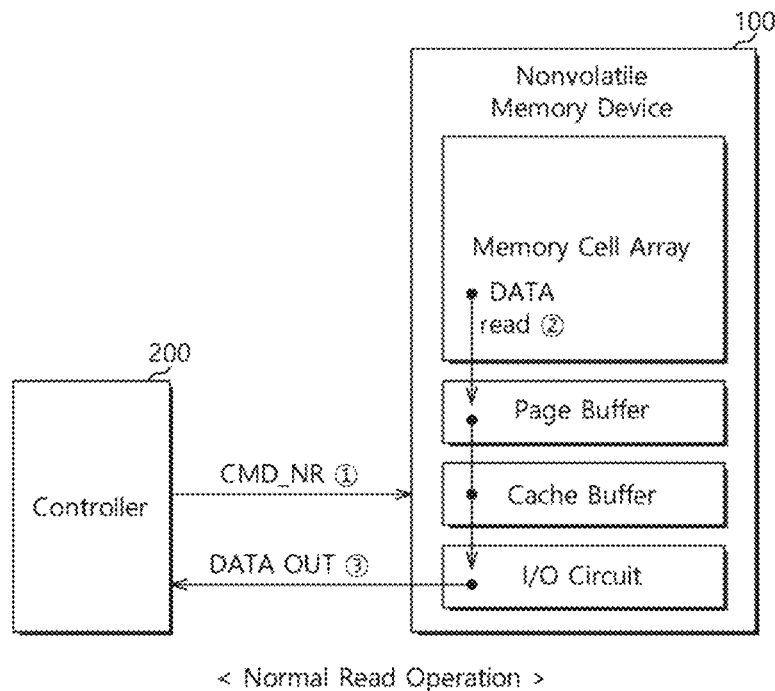
FIGS. 6B and 6C illustrate a normal read operation and a cache read operation, respectively.
Figure 6C:
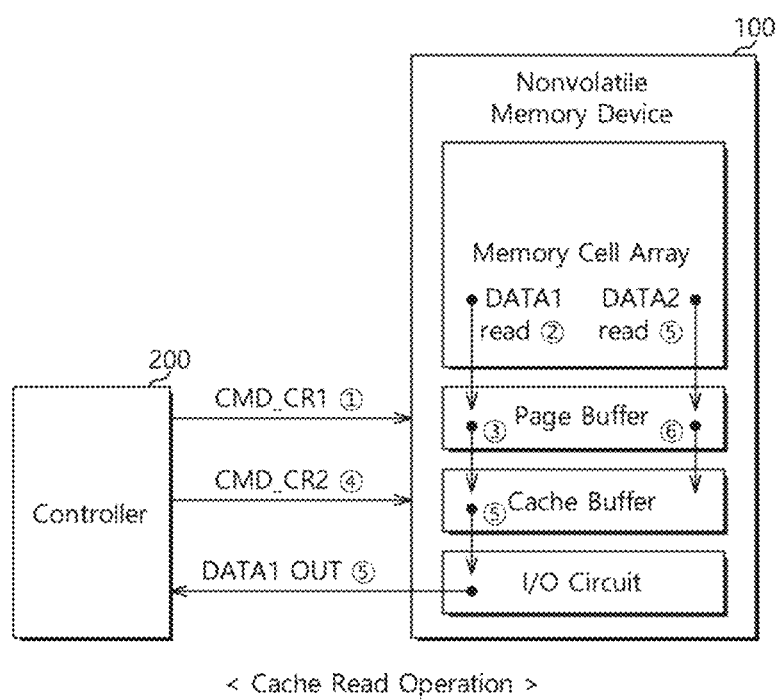

FIG. 6A illustrates a process of deciding which read operation to perform in a subsequent period according to a workload pattern in a prior period, FIG. 6B illustrates the normal read operation, and FIG. 6C illustrates the cache read operation.

As illustrated in FIG. 6A, when the first field (Only Read CMD), the second field (One type of chunk size) and the third field (Queue depth above threshold) of the workload pattern information WLPI are all set to the 'set (1)' state, the WLDM 310 may determine that it is efficient to perform the cache read operation in the subsequent period. When all the fields of the workload pattern information WLPI are set to the 'set (1)' state, it may indicate that only read operations for the same size of data chunks have been performed during the previous period, i.e. the first period. In this case, the WLDM 310 may determine that only read operations for the same size of data chunks are highly likely to be performed in the subsequent period.

When the read operations for data chunks of the same size are performed in a present period, it is more efficient to perform the cache read operation than to perform the normal read operation in a subsequent period. Therefore, the WLDM 310 may decide to perform the cache read operation on a read request received from the host device 20 in the subsequent period. Furthermore, the WLDM 310 may provide the processor 220 with a read control signal corresponding to the decision result, i.e. a cache read control signal, and the processor 220 may control the nonvolatile memory device 100 to perform the cache read operation as a read operation in the subsequent period.

When one or more of the first field (Only Read CMD), the second field (One type of chunk size) and the third field (Queue depth above threshold) of the workload pattern information WLPI are set to a 'reset (0)' state, the WLDM 310 may determine that it is efficient to perform the normal read operation in the subsequent period. When "Only Read CMD" of the workload pattern information WLPI is set to the 'reset (0)' state, it may indicate that both read operations and write operations were performed during the previous period, i.e. a second period, when "One type of chunk size" is set to the 'reset (0)' state, it may indicate that operations for different sizes of data chunks were performed, and when "Queue depth above threshold" is set to the 'reset (0)' state, it may indicate that a small number of requests were received from the host device 20. Depending on which field(s) is/are set to the 'reset (0)' state, the WLDM 310 may determine that both read operations and write operations will be performed, operations for different sizes of data chunks will be performed, or a small number of requests will be received from the host device 20, in the subsequent period.

In this case, since it is more efficient to perform the normal read operation than to perform the cache read operation, the WLDM 310 may decide to perform the normal read operation on a read request received from the host device 20 in the subsequent period. The WLDM 310 may provide the processor 220 with a read control signal corresponding to the decision result, i.e., a normal read control signal, and the processor 220 may control the nonvolatile memory device 100 to perform the normal read operation as the read operation in the subsequent period.

Referring to FIG. 6B, the normal read operation will be described as follows. When the controller 200 transfers a normal read command CMD_NR to the nonvolatile memory device 100 (①), control logic (not illustrated) of the nonvolatile memory device 100 may read data DATA corresponding to the normal read command CMD_NR from the memory cell array, and store the read data in the page buffer (②). The data DATA stored in the page buffer may be outputted to the controller 200 through the cache buffer and the input/output circuit (③). That is, the normal read operation may include a series of processes of reading data from the memory cell array in response to one read command, and outputting the read data to the controller.

Referring to FIG. 6C, the cache read operation will be described as follows. When the controller 200 transfers a first cache read command CMD_CR1 to the nonvolatile memory device 100 (①), the control logic of the nonvolatile memory device 100 may read data (for example, first data DATA1) corresponding to the first cache read command CMD_CR1 from the memory cell array, and store the read data in the page buffer (②). When the first data DATA1 stored in the page buffer is transferred to the cache buffer (③), the processing of the first cache read command CMD_CR1 may be completed.

Then, when the controller 200 transfers a second cache read command CMD_CR2 to the nonvolatile memory device 100 (④), the control logic of the nonvolatile memory device 100 may read data (for example, second data DATA2) corresponding to the second cache read command CMD_CR2 from the memory cell array and store the read data in the page buffer (⑤). Simultaneously, the control logic may output the first data DATA1 stored in the cache buffer to the controller 200 through the input/output circuit (⑤).

FIG. 6C illustrates that the controller 200 transfers the second cache read command CMD_CR2 to the nonvolatile memory device 100 when the processing of the first cache command CMD_CR1 is completed. However, the time at which the controller 200 transfers the second cache read command CMD_CR2 is not specifically limited thereto. For example, the time at which the controller 200 transfers the second cache read command CMD_CR2 may overlap the time during which the first data DATA1 is transferred to the cache buffer from the page buffer, or precede the transfer of the first data DATA1.

That is, the cache read operation may include a series of processes of reading data from the memory cell array in response to one read command, and simultaneously outputting data corresponding to the previous read command to the controller. Thus, the cache read operation may exhibit higher read performance than the normal read operation.

However, since the cache read operation stores the currently read data in the cache buffer while outputting the previous data cached in the cache buffer to the controller, it is necessary to first provide the nonvolatile memory device with a separate command for outputting the data stored in the cache buffer, and then provide the nonvolatile memory device with the next command, when the next command to be provided from the controller is not a read command. Therefore, the cache read operation may be more efficient when read commands are successively provided, and more inefficient than the normal read operation when read and write commands are mixed and provided.

In an embodiment, which of multiple types of read operations to perform may be decided according to the workload pattern in the subsequent period, which was estimated based on the workload pattern in the previous period, which makes it possible to improve the read performance.

Figure 7:
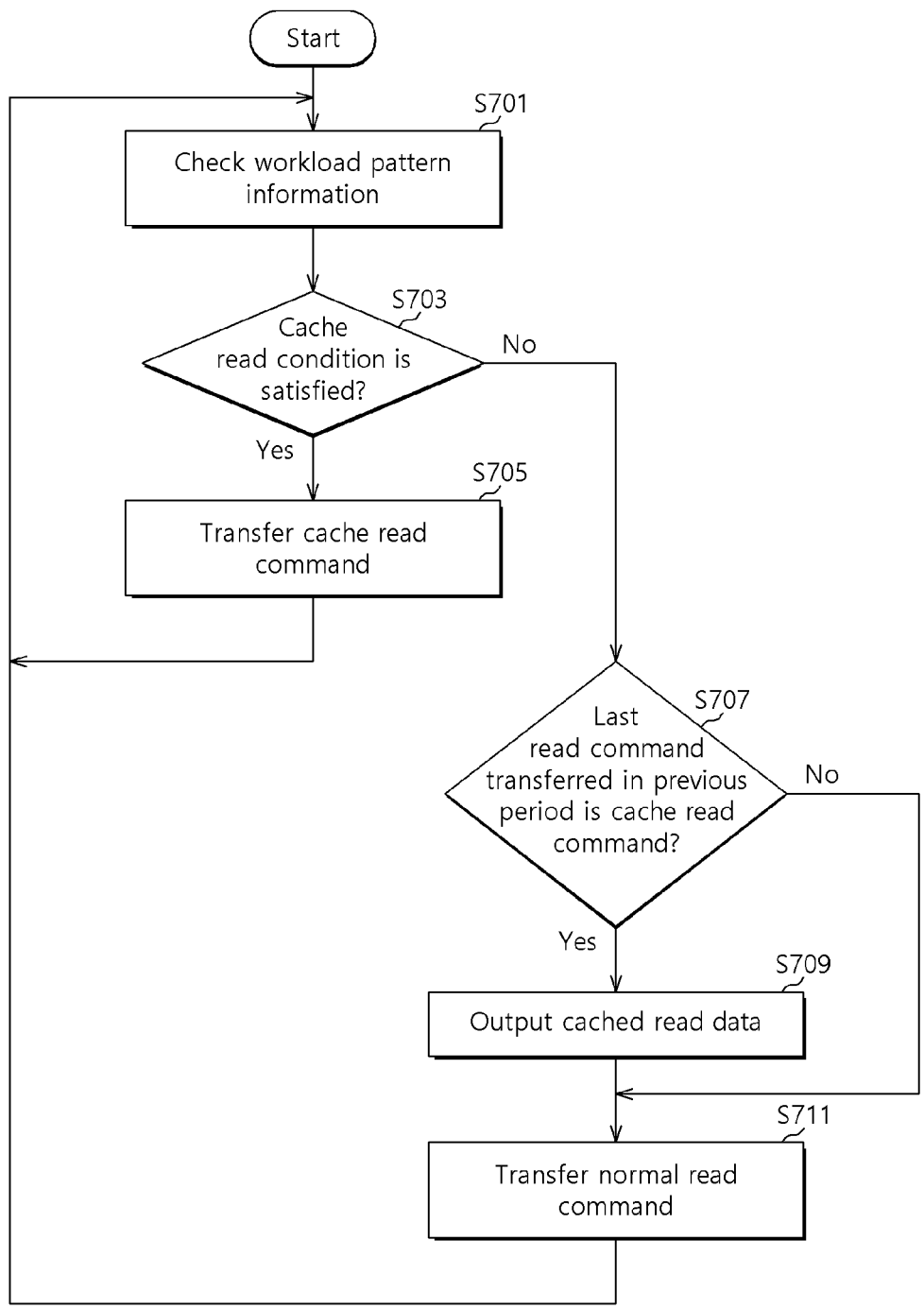
FIG. 7 illustrates an operating method of a data storage device in accordance with an embodiment.

FIG. 7 illustrates an operating method of a data storage device in accordance with an embodiment. In describing such method, one or more of FIGS. 1 to 6 may be referred to, in addition to FIG. 7.

At step S701, the processor 220 of the controller 200 may drive the WLDM 310 to check work load pattern information WLPI of a previous period, i.e. a first period.

Although not illustrated in FIG. 7, the processor 220 may drive the WLDM 310 at a time point 't' at which the first period ends, in order to detect a workload pattern of the first period from a time point 't−1' to the time point 't'. Since the workload pattern and the detection method have been described above, further description thereof is omitted here. The WLDM 310 may update the values set for the respective fields of the workload pattern information WLPI based on the detected workload pattern of the previous period.

At step S703, the WLDM 310 may determine whether a cache read condition is satisfied, based on the values set for the respective fields of the workload pattern information WLPI. For example, when the first field (Only Read CMD), the second field (One type of chunk size) and the third field (Queue depth above threshold) of the workload pattern information WLPI are all set to the 'set (1)' state, the WLDM 310 may determine that the cache read condition is satisfied. When the cache read condition is satisfied (that is, "Yes" at step S703), the procedure may proceed to step S705. On the other hand, when the cache read condition is not satisfied (that is, "No" at step S703), the procedure may proceed to step S707.

At step S705, the WLDM 310 may provide the processor 220 with a read control signal indicating that the cache read condition is satisfied, and the processor 220 may transfer a cache read command to the nonvolatile memory device 100 for performing a cache read operation in a subsequent period.

At step S707, the WLDM 310 may provide the processor 220 with the read control signal indicating that the cache read condition is not satisfied, and the processor 220 may check whether a last read command transferred in the previous period is a cache read command. If so (that is, "Yes" at step S707), the procedure may proceed to step S709. On the other hand, when the last read command transferred in the previous period is not a cache read command (that is, "No" at step S707), the procedure may proceed to step S711.

At step S709, the processor 220 may control the nonvolatile memory device 100 to output read data cached in the cache buffer (not illustrated) of the nonvolatile memory device 100.

At step S711, the processor 220 may transfer a normal read command to the nonvolatile memory device 100 in the subsequent period.

After steps S705 and S711, step S701 may be performed again.

In accordance with embodiments of the present invention, the data storage device is configured to detect a workload pattern during a set period, and selectively perform one of a cache read operation and a normal read operation based on the detected workload pattern.

That is, the data storage device may execute the cache read operation when the cache read operation has an advantage, and execute the normal read operation when the normal read operation has an advantage. Therefore, the performance of the data storage device can be maximized.

Figure 8:
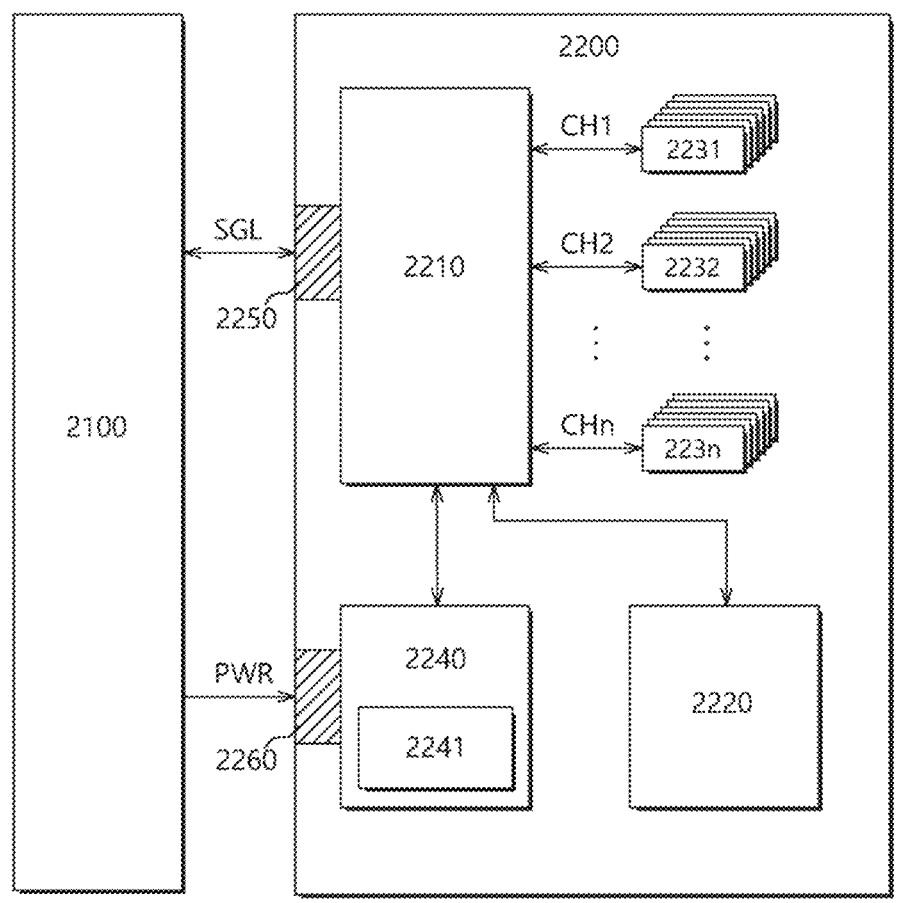
FIG. 8 illustrates a data processing system including a solid state drive (SSD) in accordance with an embodiment.

FIG. 8 illustrates a data processing system including a solid state drive (SSD) in accordance with an embodiment. Referring to FIG. 8, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

Figure 9:
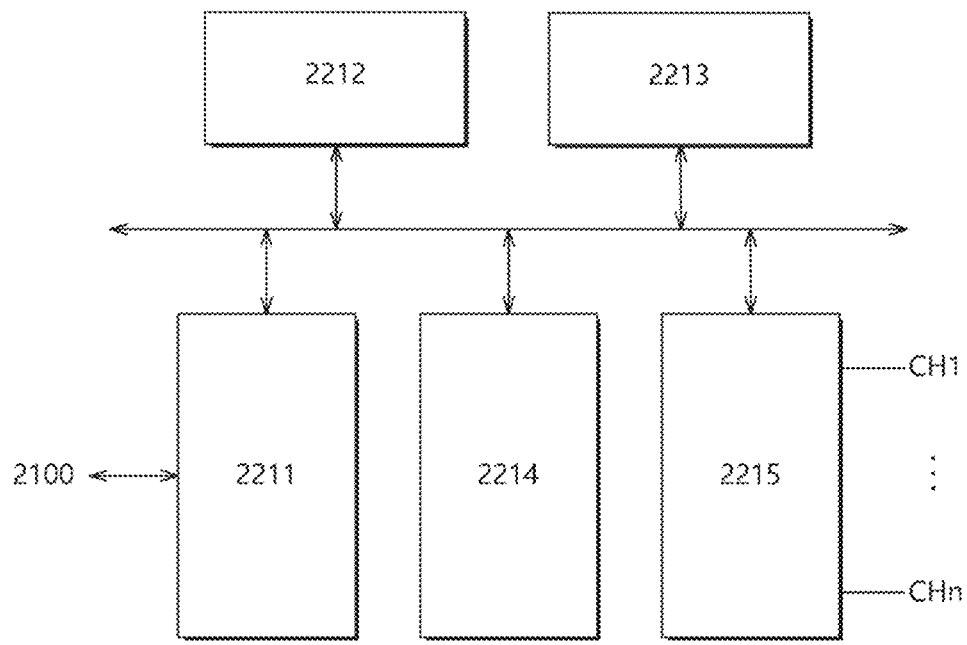
FIG. 9 illustrates a controller, such as that illustrated in FIG. 8.

FIG. 9 illustrates the controller 2210 of FIG. 8. Referring to FIG. 9, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface 2211 may perform a disc emulation function that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212.

For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 10:
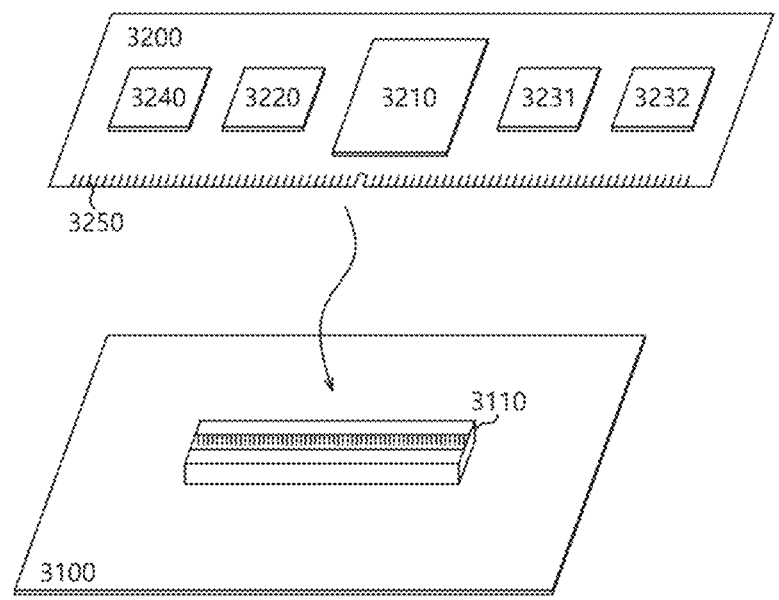
FIG. 10 illustrates a data processing system including a data storage apparatus in accordance with an embodiment.

FIG. 10 illustrates a data processing system including a data storage apparatus in accordance with an embodiment. Referring to FIG. 10, a data processing system 3000 may include a host apparatus 3100 and a data storage apparatus 3200. The host apparatus and the data storage apparatus are also referred as the host device and the data storage device, respectively.

The host apparatus 3100 may be configured in a board form such as a printed circuit board (PCB). Although not shown in FIG. 10, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may have the same configuration as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to internal components of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 11:
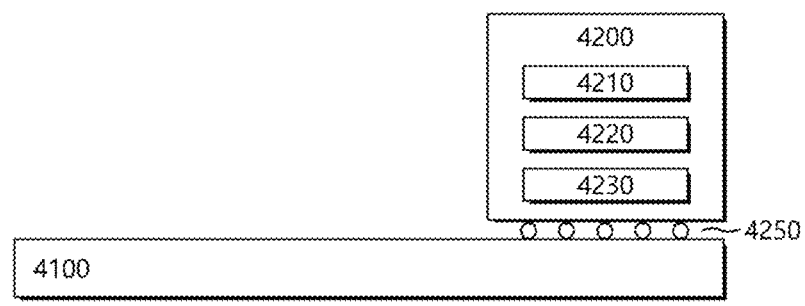
FIG. 11 illustrates a data processing system including a data storage apparatus in accordance with an embodiment.

FIG. 11 illustrates a data processing system including a data storage apparatus in accordance with an embodiment. Referring to FIG. 11, a data processing system 4000 may include a host apparatus 4100 and a data storage apparatus 4200.

The host apparatus 4100 may be configured in a board form such as a PCB. Although not shown in FIG. 11, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 12:
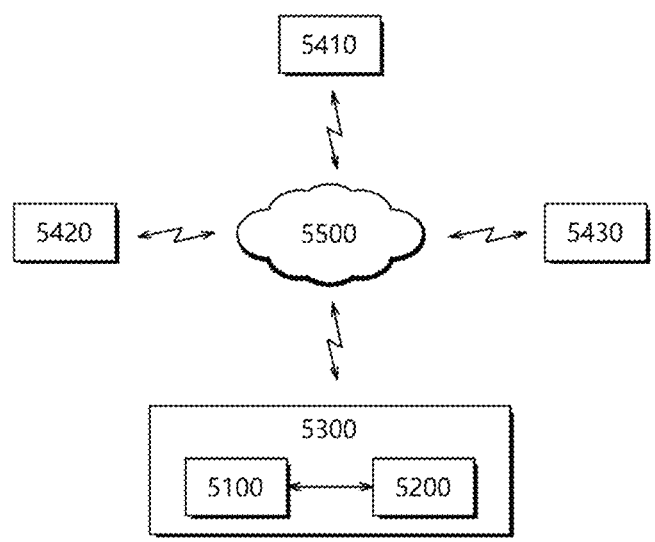
FIG. 12 illustrates a network system including a data storage apparatus in accordance with an embodiment.

FIG. 12 illustrates a network system 5000 including a data storage apparatus in accordance with an embodiment. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 10 of FIG. 1, the data storage apparatus 2200 of FIG. 8, the data storage apparatus 3200 of FIG. 10, or the data storage apparatus 4200 of FIG. 11.

Figure 13:
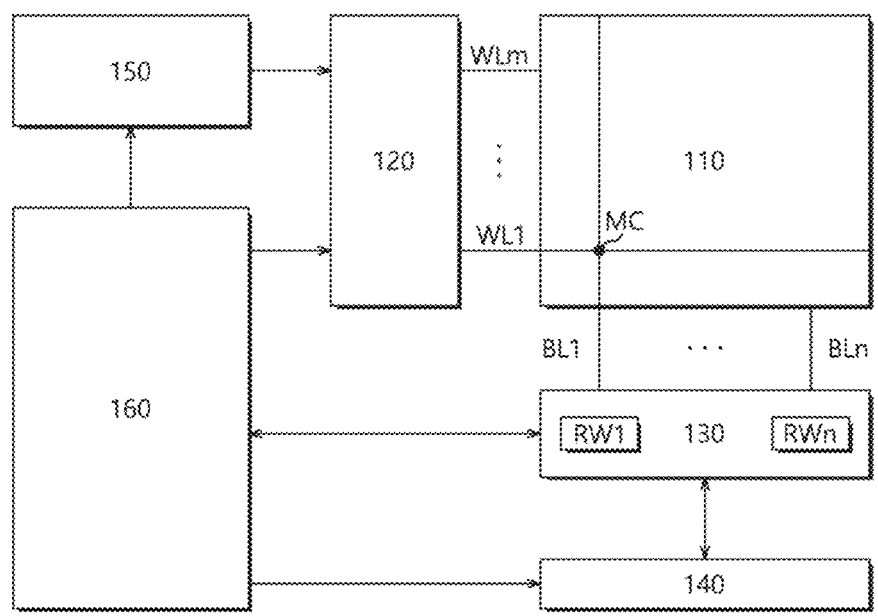
FIG. 13 illustrates a nonvolatile memory device included in a data storage apparatus in accordance with an embodiment.

FIG. 13 illustrates a nonvolatile memory device included in a data storage apparatus in accordance with an embodiment. Referring to FIG. 13, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been illustrated and described, it will be understood by those skilled in the art in light of the present disclosure that various modifications may be made to any of the disclosed embodiments. Accordingly, the present invention encompasses all such modifications that fall within the scope of the claims and their equivalents.

What is claimed is:

1. A data storage device comprising:
a nonvolatile memory device; and
a controller configured to control a read operation of the nonvolatile memory device,
wherein the controller comprises:
a memory configured to store workload pattern information; and
a processor configured to check a workload pattern in a first period based on the workload pattern information, and decide on a read mode to be performed in a second period following the first period, according to the workload pattern of the first period, and
wherein the workload pattern information comprises:
a first value indicating whether commands provided to the nonvolatile memory device in the first period are all read commands;
a second value indicating whether data chunks provided to the nonvolatile memory device in the first period are one size; and
a third value indicating whether a number of commands queued in a command queue in the first period is greater than or equal to a threshold value.

2. The data storage device according to claim 1, wherein the workload pattern of the first period comprises information indicative of whether the commands provided to the nonvolatile memory device in the first period are the same or different types, information indicative of whether the size of the data chunks provided to the nonvolatile memory device in the first period are the same or different, and information on the number of commands queued in the command queue.

3. The data storage device according to claim 1, wherein the read mode comprises a cache read mode and a normal read mode.

4. The data storage device according to claim 1, wherein when the first, second and third values of the workload pattern information are all in a set state, the processor decides that a cache read mode is to be performed in the second period.

5. The data storage device according to claim 1, wherein when one or more of the first, second and third values of the workload pattern information are in a reset state, the processor decides that a normal read mode is to be performed in the second period.

6. The data storage device according to claim 1,
wherein a flash translation layer (FTL) is loaded to the memory, and
wherein the FTL comprises a workload detection module.

7. The data storage device according to claim 6, wherein at a time at which the first period ends, the processor drives the workload detection module to detect the workload pattern in the first period, and updates the workload pattern information based on the detected workload pattern.

8. An operating method of a data storage device which includes a nonvolatile memory device and a controller configured to control a read operation of the nonvolatile memory device and including a memory for storing workload pattern information, the operating method comprising:
checking a workload pattern in a first period based on the workload pattern information; and
deciding on a read mode to be performed in a second period following the first period, according to the workload pattern of the first period,
wherein the workload pattern information comprises:
a first value indicating whether commands provided to the nonvolatile memory device in the first period are all read commands;
a second value indicating whether data chunks provided to the nonvolatile memory device in the first period are one size; and
a third value indicating whether a number of commands queued in a command queue in the first period is greater than or equal to a threshold value.

9. The operating method according to claim 8, wherein the workload pattern of the first period comprises information indicative of whether the commands provided to the nonvolatile memory device in the first period are the same or different types, information indicative of whether the size of the data chunks provided to the nonvolatile memory device in the first period are the same or different, and information on the number of commands queued in the command queue.

10. The operating method according to claim 8, wherein the deciding on the read mode to be performed in the second period comprises:
determining whether the first, second and third values of the workload pattern information are all in a set state; and
deciding that a cache read mode, as the read mode, is to be performed, when it is determined that the first, second and third values of the workload pattern information are all in the set state.

11. The operating method according to claim 8, wherein the deciding on the read mode to be performed in the second period comprises deciding that a normal read mode, as the read mode, is to be performed, when one or more of the first, second and third values of the workload pattern information are in a reset state.

12. The operating method according to claim 8, further comprising:
    detecting the workload pattern in the first period at a first time point at which the first period ends; and
    updating the workload pattern information based on the detected workload pattern.

13. The operating method according to claim 12, further comprising:
    detecting the workload pattern in the second period at a second time point at which the second period ends; and
    updating the workload pattern information based on the detected workload pattern.

14. A data storage device comprising:
    a nonvolatile memory device; and
    a controller configured to control, during a current period, the nonvolatile memory device to perform a cache read operation when the nonvolatile memory device performs a set number of times more than once only a read operation for data chunks of a single size during a previous period,
    wherein the controller generates:
    a first value indicating whether commands provided to the nonvolatile memory device in the previous period are all read commands;
    a second value indicating whether the data chunks provided to the nonvolatile memory device in the previous period are the single size; and
    a third value indicating whether a number of commands queued in a command queue in the previous period is greater than or equal to the set number.

* * * * *